(12) United States Patent
Ruberg et al.

(10) Patent No.: US 8,510,487 B2
(45) Date of Patent: Aug. 13, 2013

(54) HYBRID INTERFACE FOR SERIAL AND PARALLEL COMMUNICATION

(75) Inventors: Alan T. Ruberg, Menlo Park, CA (US); Roger D. Isaac, Sunnyvale, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 135 days.

(21) Appl. No.: 12/704,417

(22) Filed: Feb. 11, 2010

(65) Prior Publication Data

US 2011/0196997 A1    Aug. 11, 2011

(51) Int. Cl.
*G06F 13/12*  (2006.01)
*G06F 13/36*  (2006.01)

(52) U.S. Cl.
USPC ............................... 710/71; 710/313

(58) Field of Classification Search
USPC .................................... 710/71, 313
See application file for complete search history.

(56) References Cited

U.S. PATENT DOCUMENTS

| | | | |
|---|---|---|---|
| 5,428,317 A | 6/1995 | Sanchez et al. | |
| 5,982,210 A | 11/1999 | Rogers | |
| 6,477,657 B1 | 11/2002 | Kurd et al. | |
| 6,600,345 B1 | 7/2003 | Boutaud | |
| 6,718,473 B1 | 4/2004 | Mirov et al. | |
| 6,748,469 B1 * | 6/2004 | Caldwell et al. | 710/71 |
| 6,845,420 B2 * | 1/2005 | Resnick | 710/303 |
| 6,870,419 B1 | 3/2005 | Garrett et al. | |
| 6,996,749 B1 | 2/2006 | Bains et al. | |
| 7,036,032 B2 | 4/2006 | Mizuyabu et al. | |
| 7,089,444 B1 | 8/2006 | Asaduzzaman et al. | |
| 7,155,617 B2 | 12/2006 | Gary et al. | |
| 7,496,774 B2 | 2/2009 | Lu | |
| 7,505,512 B1 | 3/2009 | Anderson et al. | |
| 2002/0061016 A1 | 5/2002 | Mullaney et al. | |
| 2003/0105896 A1 | 6/2003 | Gredone et al. | |
| 2004/0098545 A1 | 5/2004 | Pline et al. | |

(Continued)

FOREIGN PATENT DOCUMENTS

| | | |
|---|---|---|
| EP | 0834814 | 4/1998 |
| JP | 05-303444 | 11/1993 |

(Continued)

OTHER PUBLICATIONS

Kevin Ross, The Basics—Very Basic Circutits, Mar. 1997, www.seattlerobics.org.*

(Continued)

*Primary Examiner* — Hyun Nam
(74) *Attorney, Agent, or Firm* — Blakely Sokoloff Taylor Zafman LLP

(57) ABSTRACT

Embodiments of the invention are generally directed to a hybrid interface for serial and parallel communication. An embodiment of a method includes initializing a first apparatus for transmission of data to or reception of data from a second apparatus, switching an interface for the first apparatus to a first mode for a parallel interface, the parallel interface including a first plurality of pins, and transmitting or receiving parallel data in the first mode via the first plurality of pins. The method further includes switching the interface of the first apparatus to a second mode for a serial interface, the serial interface including a second plurality of pins, the first plurality of pins and the second plurality of pins both including an overlapping set of pins, and transmitting or receiving serial data in the second mode via the second plurality of pins.

21 Claims, 8 Drawing Sheets

(56) References Cited

U.S. PATENT DOCUMENTS

| | | | |
|---|---|---|---|
| 2005/0030200 | A1 | 2/2005 | Holt |
| 2005/0174153 | A1 | 8/2005 | Saeki |
| 2005/0242851 | A1 | 11/2005 | Booth et al. |
| 2005/0273637 | A1 | 12/2005 | Lu |
| 2006/0284688 | A1 | 12/2006 | Miki |
| 2007/0035336 | A1 | 2/2007 | Lee |
| 2007/0080718 | A1 | 4/2007 | Stojanovic et al. |
| 2007/0281741 | A1 | 12/2007 | Lu et al. |
| 2008/0164905 | A1 | 7/2008 | Hamanaka |
| 2008/0310491 | A1 | 12/2008 | Abbasfar et al. |
| 2009/0256585 | A1 | 10/2009 | Kwon et al. |
| 2010/0060316 | A1 | 3/2010 | Kim et al. |
| 2010/0097094 | A1 | 4/2010 | Jang |
| 2010/0157644 | A1 * | 6/2010 | Norman .................. 365/51 |
| 2010/0164539 | A1 | 7/2010 | Balamurugan et al. |
| 2011/0050280 | A1 | 3/2011 | Maddux et al. |

FOREIGN PATENT DOCUMENTS

| | | |
|---|---|---|
| JP | 08-286780 | 11/1996 |
| JP | 2002-091608 | 3/2002 |
| TW | I224248 | 11/2004 |

OTHER PUBLICATIONS

IPRP, International Preliminary Report on Patentability for International Patent Application No. PCT/US2008/057926 mailed Oct. 8, 2009.

ISR&WO, International Search Report & Written Opinion for International Application No. PCT/US2008/57926 mailed Aug. 7, 2008.

USPTO, Non-Final Office Action for U.S. Appl. No. 11/690,659, Feb. 23, 2010.

Notice of Allowance for U.S. Appl. No. 11/690,659, mailed Aug. 25, 2010.

International Search Report and Written Opinion for International Patent Application No. PCT/US2011/023697, Mailed Oct. 25, 2011, 11 pages.

Office Action from CN Patent App. No. 200880009120.0 mailed Feb. 15, 2012, 10 pages.

Office Action having a response deadline of Jun. 25, 2011 (+ English translation), in Taiwan Patent Application No. 097108675, 9 pages.

Office Action dated Nov. 19, 2012 (+ English translation), in Japanese Patent Application No. 2009-554784, 4 pages.

International Search Report and Written Opinion of the International Searching Authority in International Patent Application No. PCT/US2012/043767, 11 pages.

International Search Report and Written Opinion of the International Searching Authority in International Patent Application No. PCT/US2012/043770, 9 pages.

Office Action dated Dec. 5, 2012 (+ English translation), in Chinese Patent Application No. 200880009120.0, 16 pages.

Office Action dated Jan. 15, 2013, in U.S. Appl. No. 13/174,630, 12 pages.

Office Action mailed Jan. 15, 2013, in U.S. Appl. No. 13/174,616, 15 pages.

* cited by examiner

HYBRID INTERFACE FOR SERIAL AND PARALLEL COMMUNICATION

TECHNICAL FIELD

Embodiments of the invention generally relate to the field of data communications and, more particularly, a hybrid interface for serial and parallel communication.

BACKGROUND

A system may include one or more serial interfaces for the transmission or reception of serial data. An interface may be a clock data recovery (CDR) based interface that recovers a clock signal from data, including, for example, a (Serializer-Deserializer) interface providing serialization and deserialization of data for transfer.

A serial interface may utilize a significant amount of power because of the CDR circuit itself and because of the reference oscillator, such as a frequency multiplier PLL, that is generally used when high frequencies are necessary. To order to reduce power consumption, a conventional system may switch off the interface in certain circumstances.

However, the startup latency of the CDR and reference oscillator components may be unacceptable and may waste power during the startup period. In low power modes for devices, it is common to run circuitry at lower frequencies, but such a low power mode does not result in significant power savings when using a CDR component in an interface.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Figure 1:
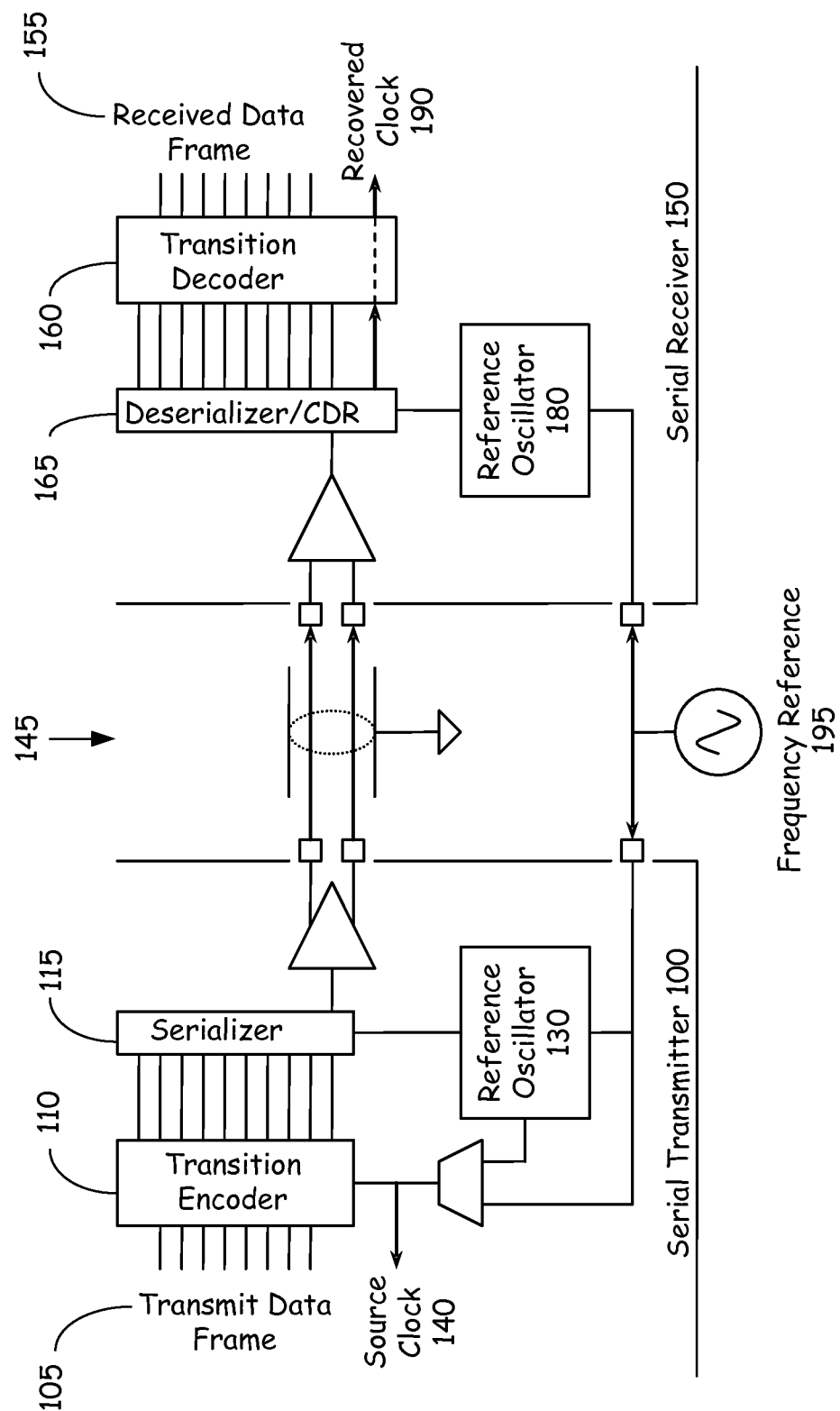
FIG. 1 is an illustration of a CDR-based serial interface.

Embodiments of the invention are generally directed to a hybrid interface for serial and parallel communication.

In a first aspect of the invention, a method includes initializing a first apparatus for transmission of data to or reception of data from a second apparatus, switching an interface for the first apparatus to a first mode for a parallel interface, the parallel interface including a first plurality of pins, and transmitting or receiving parallel data in the first mode via the first plurality of pins. The method further includes switching the interface of the first apparatus to a second mode for a serial interface, the serial interface including a second plurality of pins, the first plurality of pins and the second plurality of pins both including an overlapping set of pins, and transmitting or receiving serial data in the second mode via the second plurality of pins.

In a second aspect of the invention, an apparatus includes a parallel interface having multiple parallel communication lines on a first plurality of pins to transmit parallel data to or receive parallel data from a second apparatus, a serial interface having multiple serial communication lines on a second plurality of pins to transmit or receive serial data, the first plurality of pins and the second plurality of pins including an overlapping set of pins. The apparatus further includes mode logic to switch between a first mode for the parallel interface and a second mode for the serial interface.

DETAILED DESCRIPTION

Embodiments of the invention are generally directed to a hybrid interface for serial and parallel communication.

In some embodiments, a method, apparatus, or system provides for a hybrid interface for serial and parallel communication.

In some embodiments, a hybrid interface provides for sharing pins between interfaces, such as between a CDR-style serial interface and a bit-wise parallel interface. In an implementation, a parallel interface may run at a significantly lower speed than a serial interface, but the parallel interface has negligible start-up latency in comparison with the serial interface, and does not use the CDR component, thus saving power consumption. Further, the parallel interface may operate without additional reference oscillator components, saving further power. In some embodiments, communication latency may be reduced by elimination of bit-wise serialization, framing, and the coding (such as 8b/10b (mapping 8 bit symbols to 10 bit symbols), 17b/20b, or 64b/66b coding) overhead that may be required by CDR in favor of a parallel communication scheme.

In some embodiments, CDR-based serial interface elements are incorporated with bit-wise parallel (synchronous/asynchronous) interface elements to provide a hybrid communication interface. In some embodiments, communication is dynamically switched between the two interface modes. In some embodiments, a process, apparatus, or system includes pin sharing between the serial and parallel interfaces; and clock control for the hybrid interface, including reference oscillator bypass timing.

In some embodiments, a hybrid interface may be utilized to address issues of poor power utilization in conventional interfaces. Circuitry for a parallel interface of a hybrid interface may utilize less absolute power (though not necessarily less power in terms of power per bit) because the CDR and reference oscillator circuits are inoperative. In some embodiments, elimination of the CDR component for communications further may reduce communication latency caused by deserialization (frame size×bit rate) and reduce bandwidth overhead by elimination of a coding scheme required for CDR synchronization. In some embodiments, a hybrid interface further provides support for standardized synchronous interfaces such as memory (DRAM, FLASH, etc) and Serial Peripheral Interface (SPI). In some embodiments, performing tests on an embodiment of a hybrid interface may be simplified because of lower speed and standard parallel operation. In some embodiments, a clock switching method may be utilized to hide reference oscillator and CDR start-up latency and lower power during low speed communications. If multiple interfaces are available, then a parallel interface with acceptable bandwidth and low latency can be constructed for an apparatus or system.

Clock-Data Recovery (CDR)-based interfaces (such as a SERDES interface) use a significant amount power because of the powering of the CDR circuit itself and the powering of a reference oscillator circuit, such as PLL frequency multiplier, when high frequencies are necessary. Good power utilization is possible with lowered pin count when the SERDES is operating at a high frequency, but the power savings diminish at lower frequencies. To save power, it is common to switch an interface off, but this may result in unacceptable startup latency for the reference oscillator and the CDR (in the range of microseconds for bit durations of much less than 1 nanosecond), and further wastes power during the startup period. Running a CDR-based interface at a lower frequency does not save a significant amount of power.

A CDR circuit operates to extract a data sampling clock directly from a single bit stream. This technique is important for environments where an out-of-band clock is not available, and where the data rate is too fast to effectively distribute a clock for sampling the data. If the transmission times of independent clock and data circuits do not match, transmission errors occur when the data is sampled at the wrong time. This occurs when the length of the individual circuits is difficult to match due to the speed of light delay in the circuit medium.

In certain preferred embodiments, CDR operations are typically, but not exclusively, performed by locking an independent oscillator frequency and phase to available transitions in a pulse code modulated (PCM) or pulse width modulated (PWM) bit stream. Such an oscillator produces a local clock that is then used to sample the data stream, in particular at times when no transitions are available to identify the clock phase in the PCM case. The oscillator will consume a significant amount of power, and each bit stream will generally require its own oscillator. In certain embodiments, the CDR oscillator will commonly take the form of a phase-locked loop (PLL) or delay-locked loop (DLL) for PCM data, but is not limited to these implementations. To improve power and reliability, the CDR oscillator may be referenced to another oscillator, including, but not limited to, an additional PLL or DLL, where such oscillator is hereinafter referred to as a "reference oscillator". In some embodiments, a reference oscillator can be shared among multiple CDR circuits.

Lower speed parallel interfaces usually have simple transmitters and receivers, using such standards as TTL (transistor-transistor logic), CMOS (complementary metal-oxide-semiconductor) at varying voltages, and SSTL (stub series-terminated logic)-style interfaces. These interfaces generally have the property that the total power is reduced in proportion to frequency because of capacitive circuit characteristics. The power is also reduced significantly by reducing voltage swing, but lower voltages require either voltage references (the precision of which depends on the magnitude of the voltage swing), or differential signals that use more pins, both of which are avoided in low-power circuits. This may provide a disadvantage at high frequencies, but when the frequency is lower, the power becomes negligible and the CDR and reference oscillator power associated with high-speed serial interfaces is eliminated providing a good alternative with reduced bandwidth requirements. In addition, by bypassing an intermediate reference oscillator, a reference clock can be changed at-will to affect a low-latency performance-power tradeoff.

Because a high-speed CDR-based interface generally uses low voltage or current and the parallel interface uses a simplified signal strategy with higher voltages, it is very likely that the electrical properties of the two will be different. In some embodiments, a hybrid interface allows for different electrical properties for a serial interface and a parallel interface that share one or more pins.

Some serial interfaces, such as M-PHY from the MIPI® (Mobile Industry Processor Interface) Alliance, support a low speed mode, but contemplate the primary use of a single interface, an isolated (AC) galvanic or optical interface, and the likely absence of clock connections. Additionally, many applications of serial interfaces are unidirectional and are not sensitive to latency. The approach in these cases is to save some power using low-speed serial signaling where the electrical properties are the same for both modes and frames are handled in the same way as for the high speed mode, with transition coding for DC balance and de-serialization (e.g. 8b10b). PWM signaling reduces CDR power at low speeds and eliminates the reference oscillator component, such as a PLL. At times when there is a shared clock and synchronous operation (e.g. reference oscillator bypass), PCM mode is supported and uses minimum power, but the data remains coded, balanced and is communicated serially.

The requirements of singleton interface support, isolated interfaces, and absence of clock circuits may prevent implementation of a shared parallel interface. A single interface (differential or optical) does not have sufficient connections to make a parallel interface practical—the interface does not improve either bandwidth or latency on its own. Electrically isolated connections require DC balancing to avoid charging of the transmission medium, causing data errors because parallel interfaces are not DC balanced. Further, a parallel interface is not effective without a clock or data strobe. The latency for running a serial port at low frequencies is significantly high. For example, with a 10-bit frame at 5 Gbit/sec in high-speed mode, the latency due to serialization is 2 ns. In low-speed serial mode, the same frame at 200 Mbit/sec has 50 ns latency (not acceptable for many modern applications, such as memory accesses). The latency for the parallel interface at 200 MHz is 5 ns, 10 times faster, but requires 8 circuits (assuming 8b/10b coding for the serial interface) to deliver the same data. 8 low-speed serial circuits could be used to match the 8 parallel circuit data rate, but this does not improve the latency.

FIG. 1 is an illustration of a CDR-based serial interface. In this illustration, an example of a CDR-based serial interface is provided with a shared frequency reference and reference oscillators to simplify the CDR design. The transmitted data is transition encoded to ensure that the receiving CDR has the signal edges necessary to lock its oscillator.

In this illustration, a serial transmitter apparatus 100 is coupled with serial receiver apparatus 150. The serial transmitter 100 includes a transition encoder 110 to receive transmit data frames 105 for transmission, and a serializer 115 to serialize data for transmission via serial pins of the connection 145 with the serial receiver 150. The serial transmitter 100 and the serial receiver 150 both receive a frequency reference signal 195. The frequency reference signal is provided to a reference oscillator component 130 to generate a clock for the serializer 115. The frequency reference signal 195 or the output of the reference oscillator 130 is further provided to the transition encoder 110 and to provide a source clock 140.

The serial receiver 150 includes a deserializer/CDR 165 to deserialize data and recover a clock signal 190. The receiver 150 further includes a transition decoder 160 to decode data and produce received data frames 155, as clocked by the recovered clock signal 190. The frequency reference signal 195 is provided to a reference oscillator component 180 to generate a clock signal for the deserializer/CDR component 165.

In FIG. 1, the originating parallel data is presented to the transition encoder 110, which is utilized to guarantee sufficient amplitude transitions for CDR operation, then the data is passed on to serializer 115 for transmission at higher speeds using fewer pins than a parallel transmission. In some implementations, a differential galvanic transmission medium may be utilized to improve reliability. Data received via serial pins of the connection 145 is then de-serialized by the CDR/Deserializer 165r, and fed through the transition decoder 160 to reproduce the original parallel data stream. The application of such a circuit has greatly reduced pin-count in comparison to the original data frame (a reduction of 4 to 1 in this example), while, for example, being transmitted at ten times the original data rate given by the source clock.

To save power with such high signal rates, it is common practice to use reduced signal power compared to simple digital interfaces, such as TTL or CMOS. This commonly involves a transmission line that is resistively terminated, with a low voltage (using either a voltage or current source) to minimize dynamic power caused by parasitic capacitance. Even with reduced power, signal integrity is maintained at high speeds when differential signaling is applied.

Figure 2:
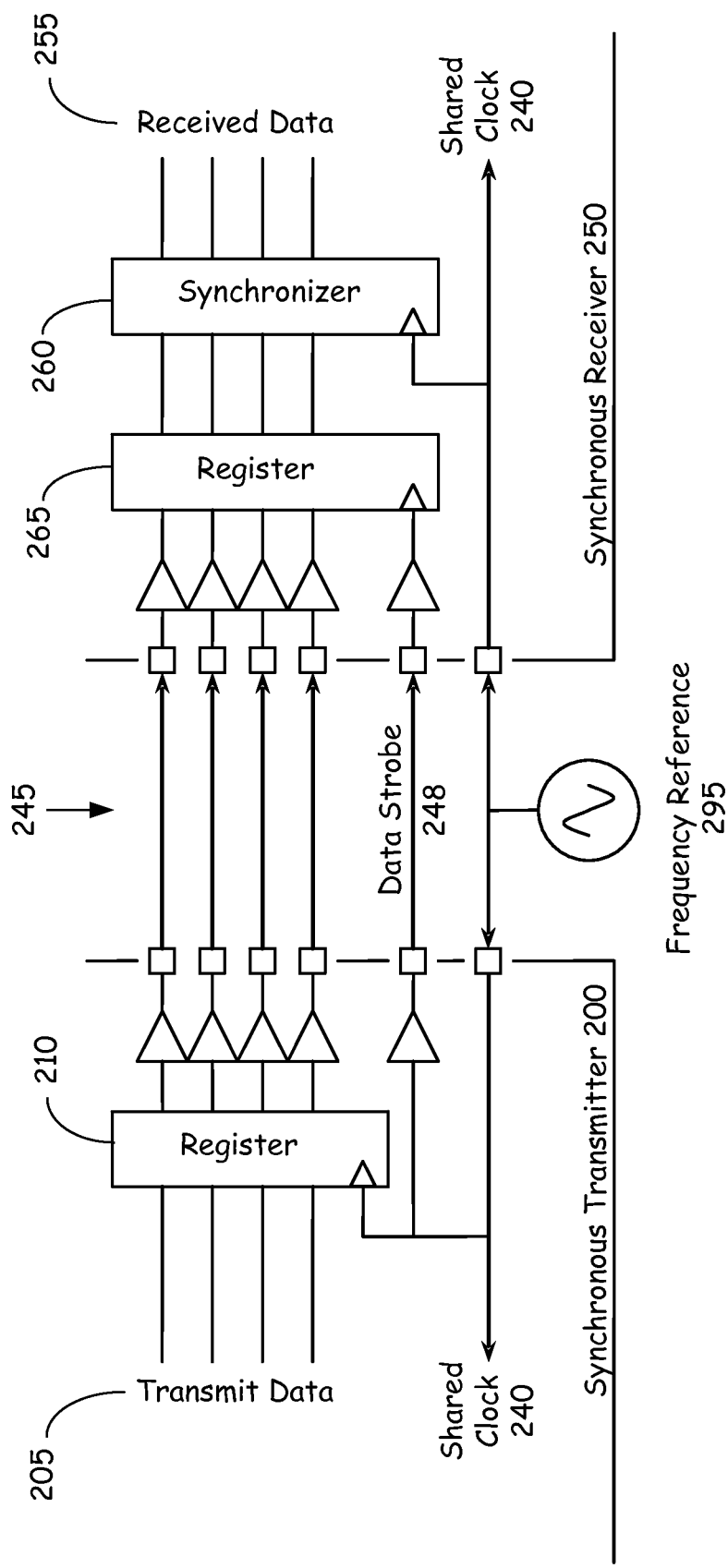
FIG. 2 is an illustration of a parallel interface.

In some embodiments, CDR-based serial interface components are combined with parallel interface elements to form a hybrid interface. FIG. 2 is an illustration of a parallel interface. In this illustration, a synchronous transmitter 200 is coupled via single-ended galvanic link 245 to a synchronous receiver 250. The transmitter 200 receives transmit data 205, which is provided to a register 210 for transmission. In this illustration, the transmitter and the receiver 250 share a frequency reference 295. For the transmitter 200, the frequency reference 295 is utilized to produce a shared clock 240, and is utilized for clocking the register 210 for transmission and for generating the data strobe 248 to clock the transmitted parallel data. The receiver 250 then receives data via the link 245 for holding in a register 265. The register 265 is coupled with a synchronizer 260 to produce the received data 255, with the synchronizer 260 being clocked by the frequency reference 295.

Some parallel communication operates without a particular shared time reference (asynchronous operation) and, for example, determines the moment of valid data using a signal-dependent method. Other parallel communication determines the moment that data is valid using a shared time reference, or clock pulse (synchronous operation). In case the frequency of transmission is relatively high compared to the speed of light in the medium, a data strobe that is synchronized to the data is used to signify the moment when the data is valid using matched propagation across the interface. This may be implemented using matched buffer amplifiers for the strobe and data as well as matched circuit length. A shown in FIG. 2, multiple data bits are shown and are synchronized to the data strobe 248. When the frequency is low, the data strobe 248 may be unnecessary. After registration, the synchronizer 260 re-times the received data to the shared clock, 240 also based on the frequency reference.

Figure 3:
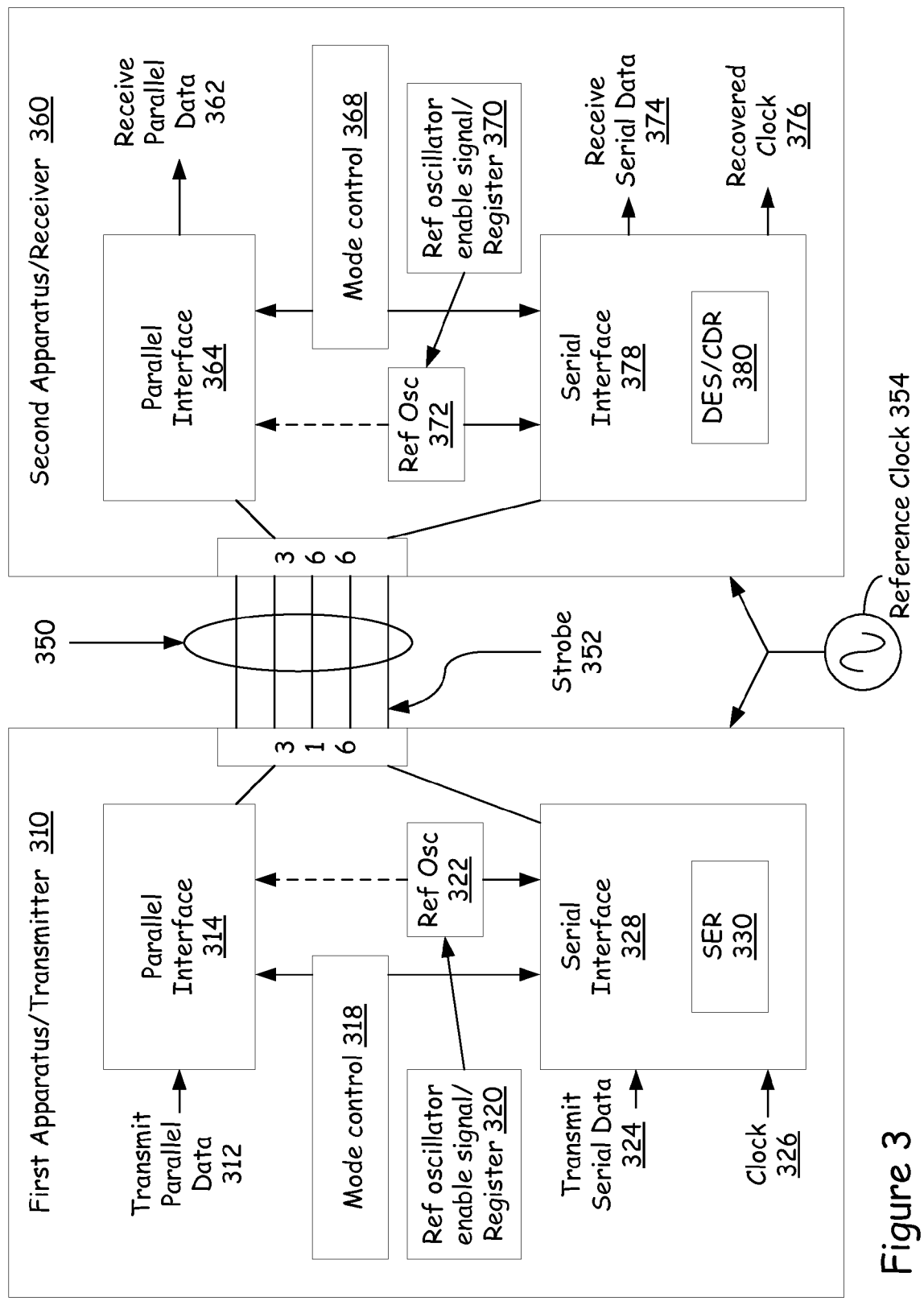
FIG. 3 is a block diagram is to illustrate an embodiment of a hybrid interface.

FIG. 3 is a block diagram is to illustrate an embodiment of a hybrid interface. In this illustration, a first apparatus (or transmitter) 310 is connected to a second apparatus (or receiver) 360 via an interface 350, wherein the interface includes multiple lines or pins. In some embodiments, each apparatus includes a hybrid interface, with the first apparatus 310 including parallel interface 314 and serial interface 328 (receiving clock signal 326 and including serializer 330 for the serialization of data for transmission) and the second apparatus 360 including parallel interface 364 and serial interface 378 (receiving including deserializer/CDR component 380 for the deserialization of received data and the recovery of clock signal 376 from the received data). In some embodiments, each apparatus 310 and 360 includes a mode control (318 for the first apparatus and 368 for the second apparatus) to establish whether the respective apparatus is in a first mode for parallel operation using the parallel interface (314 and 364) or a second mode for serial operation using the serial interface (328 and 378). In some embodiments, the first apparatus 310 may include one or more multiplexers or other switching elements 316 to switch between the parallel interface 314 and the serial interface 328, and the second apparatus 360 may include one or more multiplexers or other switching elements 366 to switch between the parallel interface 364 and the serial interface 378.

As illustrated, the parallel interface 314 of the first apparatus 310 may obtain data 312 for parallel transmission via the parallel interface 314, the transmission being received via the parallel interface 364 of the second apparatus 360 to provide the received data 362. Further, the serial interface 328 of the first apparatus 310 may obtain data 324 for serial transmission via the serial interface 328, the transmission being received via the serial interface 378 of the second apparatus 360 to provide the received data 374.

The first apparatus 310 and the second apparatus 360 each include a reference oscillator (322 and 372), which may be embodied by a frequency multiplying phase-locked loop, and which may be controlled by logic providing a control signal or register (320 and 370). In some embodiments, the reference oscillator (322 and 372) is enabled for use with the serial interface (328 and 378). When the parallel interface 314 and 364 is enabled, the reference oscillator may be enabled or disabled, depending on the embodiment. In some embodiments, first apparatus 310 and second apparatus 360 may share a reference signal 354, including the sharing of such reference signal 354 between the reference oscillator 322 of the first apparatus 310 and the reference oscillator 372 of the second apparatus 360.

In some embodiments, the first and second apparatuses each utilize a plurality of pins in the link 350 between the apparatuses, the first apparatus 310 utilizing a first plurality of pins for communication lines and the second apparatus 360 utilizing a second plurality of pins for communication lines, with the apparatuses sharing an overlapping set of pins of first and second pluralities of pins. The link may include one or more pins for transmission of a strobe 352 for capture of data in the first mode. In some embodiments, the pins of the overlapping set of pins may be utilized in differing manners in the first mode and the second mode, including but not limited to variation in signal type, signal voltage, signal direction, and uni- or bi-directional signal transmission.

Figure 4:
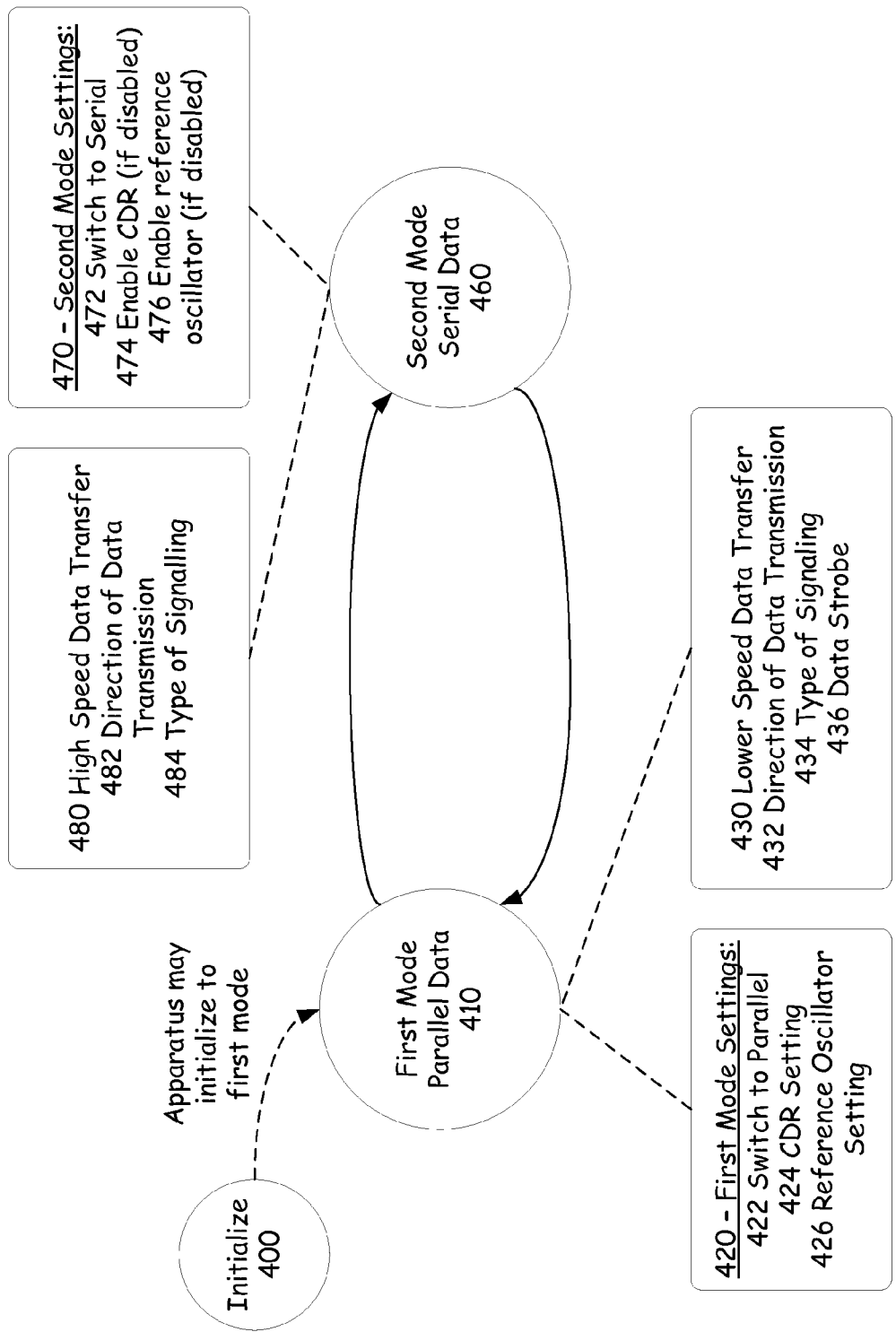
FIG. 4 is a state diagram to illustrate the transitions between the states in an embodiment of a hybrid interface.

FIG. 4 is a state diagram to illustrate the transitions between the states in an embodiment of a hybrid interface. In this illustration, a system may be initialized 400, and then may transition between a first mode for parallel data 410 and a second mode for serial data 460. In some embodiments, the system may default to the first mode 410 upon initialization, but this is not required in all embodiments. In other embodiments, the system may default to the second mode or to neither mode. The system may switch between the first mode 410 and the second mode 460 in operation, with the first mode 410 providing lower power operation and the second mode providing higher speed operation.

In this illustration, first mode settings 420 may include switching a mode setting to parallel 422, as well as a CDR setting 424 (which may be disabled for parallel transmission in the first mode) and a reference oscillator setting (which may be enabled or disabled depending on the implementation). Further, the system may, for example, utilize a lower speed data transfer 430 in comparison with the second mode 460. In some embodiments, a direction of data transmission 432 may be established, as well as a type of signaling 434 (including, for example, a voltage or current signal of a certain value) and the possible use of a data strobe 436 for clocking of data. Second mode settings 470 may include switching a mode setting to serial 472, as well as enabling a CDR (if disabled) 474 and enabling a reference oscillator (if disabled) 474. Further, the system may, for example, utilize a high speed data transfer 480 in comparison with the first mode 410. In some embodiments, a direction of data transmission 482 may be established, as well as a type of signaling 484 (including, for example, a voltage or current signal of a certain value).

Figure 5:
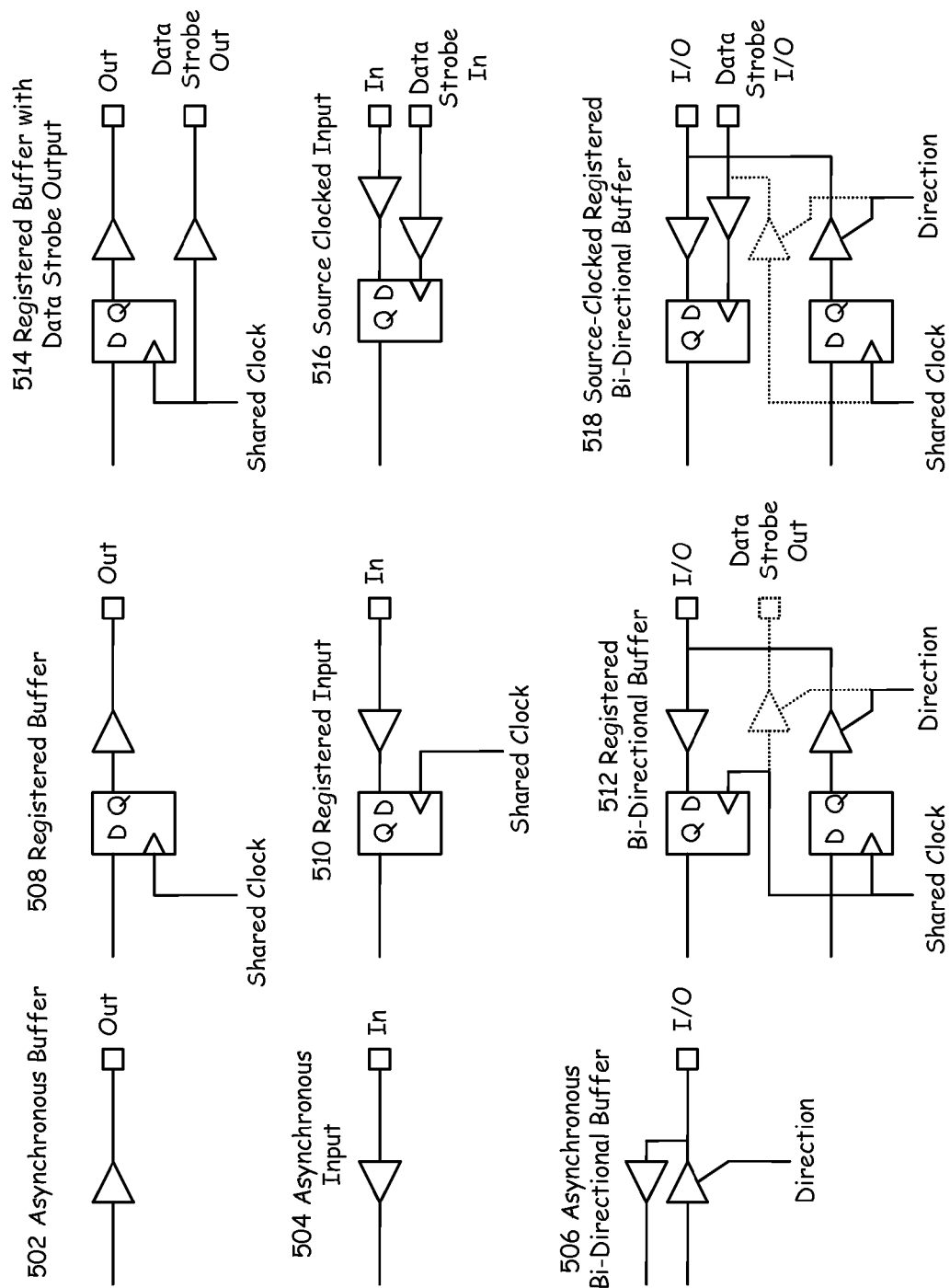
FIG. 5 is an illustration of I/O interfaces for embodiments of interfaces.

FIG. 5 is an illustration of I/O interfaces for embodiments of interfaces. The interface circuits shown in FIG. 5 may be utilized with parallel interfaces, and may be implemented in an embodiment of a hybrid interface for parallel operation. Interfaces 502 (asynchronous buffer), 504 (asynchronous input), and 506 (asynchronous bi-directional buffer) are unregistered interfaces that can be used with data strobes, for example. Interface 508 (register) is a generic registered output that uses the shared clock. Interface 514 (Registered input) is the same interface as 508 but that additionally shows the transmission of a data strobe. Interfaces 510 and 512 illustrate receivers that are synchronized to a shared reference clock in case the frequency is sufficiently low that a data strobe is unnecessary. Parallel to 510 and 512, 516 and 518 illustrated source-clocked receivers. In these examples, the optional synchronizer is not shown, the inclusion of which depends on the clock relationship of the functional circuitry at the receiver. FIGS. 506, 512, and 518 illustrate bi-directional versions of the interfaces. The synchronous components shown are for single data rate communications—double data rate is handled similarly. All of the illustrated interfaces, in addition to others, may be supported by the parallel component of an embodiment of an apparatus.

Figure 6:
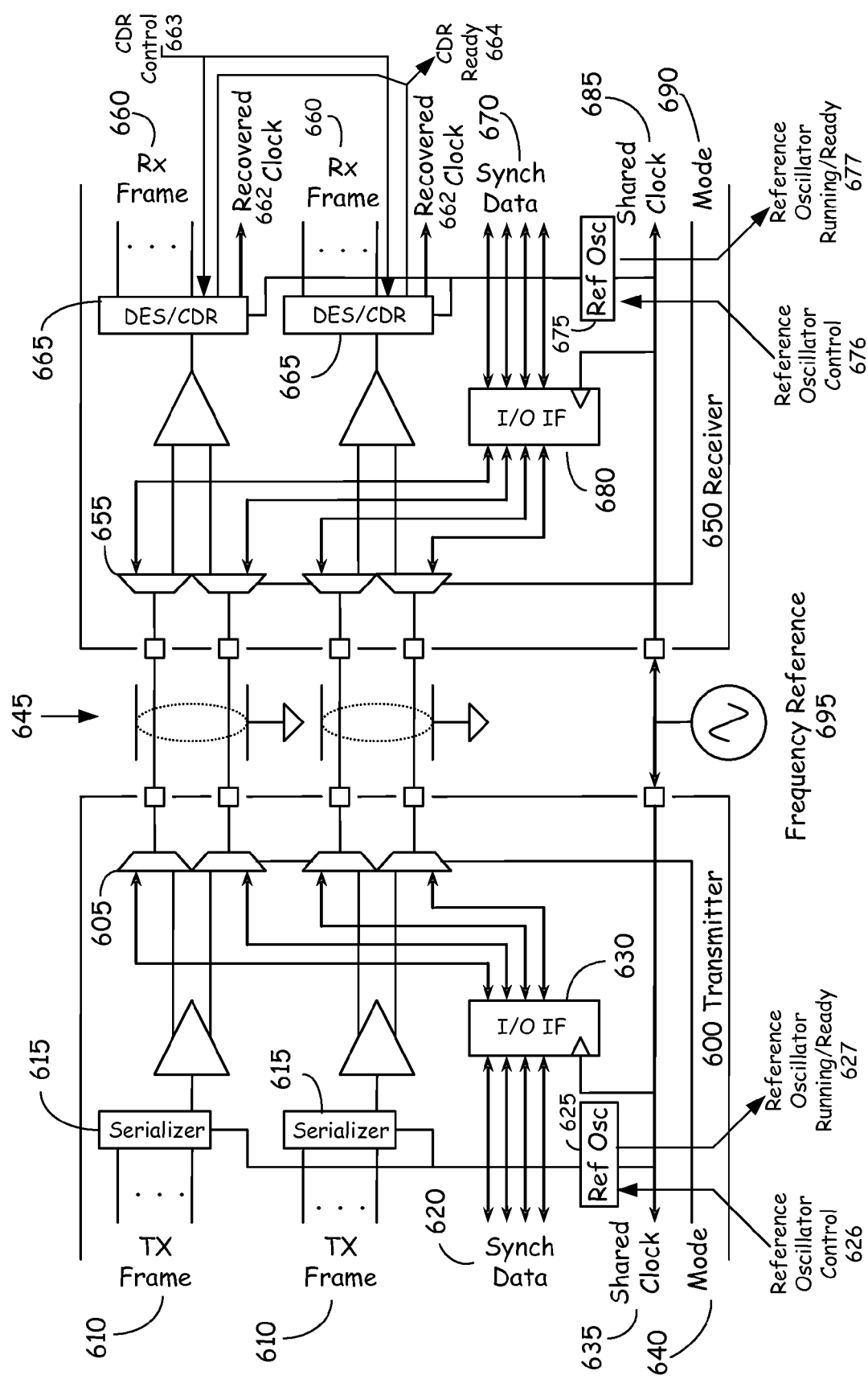
FIG. 6 is a block diagram to illustrate an embodiment of a hybrid serial-parallel interface.

FIG. 6 is a block diagram to illustrate an embodiment of a hybrid serial-parallel interface. For simplicity in illustration, serial communication is shown going from left (transmitter 600) to right (receiver 650), but each of the illustrated apparatuses could include both transmitters and receivers. In addition, transition coding is not shown in FIG. 6, such encoding being omitted to improve readability of the illustration. The transmitter 600 and receiver 650 are connected via links for the interface 645. In this figure, a differential interface is provided, with such interface being commonly utilized in high-speed galvanic interfaces to reduce noise emissions, reject noise injection, and provide good signal reception at low voltages for low power. In addition, the differential interface doubles the number of wires utilized for serial transmission, and thus provides twice as many parallel circuits for the parallel mode. In some embodiments, the transmitter and receiver may each receive a Mode signal (640 and 690) to select either a parallel interface mode or a serial interface mode.

In FIG. 6, a serial interface for the transmitter 600 includes one or more serializers 615 for the serialization of transmit frames 610. A parallel interface includes I/O IF blocks 630 for transmission of data 620, which may include sub-circuits illustrated in FIG. 5 and synchronizers. These elements have been encapsulated in the respective blocks to improve readability, but embodiments are not limited to the illustrated form of the components. Similarly, the receiver includes a serial interface including deserializer/CDR components 665 to generate receive frames 660 and a recovered clock 662 from the received data. A parallel interface includes I/O IF blocks 680 for receiving data 670, which may include sub-circuits illustrated in FIG. 5 and synchronizers.

In some embodiments, the transmitter 600 and receiver 650 each include a reference oscillator, 625 and 675 respectively. The reference oscillator 625 and 675 may include, but it not limited to, a PLL device or DLL device. In some embodiments, an output of the reference oscillator 625 or 675 is provided to each serializer 615 for the transmitter 600 or to each deserializer/CDR 665 for the receiver 650, respectively. In some embodiments, the reference oscillator is enabled or disabled by a reference oscillator control signal 626 and 676, and the reference oscillator provides a reference oscillator running/ready signal 627 and 677 to indicate a state of the reference oscillator. Further, each deserializer CDR may receive a CDR control signal 663 to control operation of the CDR, and may produce a CDR Ready signal 664 to indicate a state of the CDR.

In some embodiments, a common frequency reference 695 is used for serial transmitters, serial receivers, and the parallel interface of an apparatus. However, the common frequency reference is not required for all embodiments. Such a frequency reference is utilized in, for example, low-power systems and low-cost systems where fewer components and pins are desired. A shared reference is not required between serial components because the clock can be entirely derived from the data at the receiver. In some embodiments, the parallel interface phase and frequency is used independently of the serial interface, and thus an independent reference may be utilized. In some embodiments, data strobes or signal relationships are used to indicate valid data at the parallel receiver, and thus a reference is unnecessary. However, this discussion is simplified to the case of a common frequency reference in order to simplify the description of embodiments. FIG. 6 relates to embodiments that include clock management in an environment that uses shared clocks, including the shared clock 635 and 685 provided with the frequency reference.

FIG. 6 illustrates an embodiment in which multiple serial interfaces are available for the interface connection 645 between the embodiments, thus providing a wider parallel interface (4 bits in the illustration). Embodiments are not limited to any particular number of interfaces. For example, 4 serial links would allow for an 8-bit connection for parallel circuits, and 8 serial links would allow for a 16-bit connection for parallel circuits when differential serial interfaces are to be shared.

In some embodiments, the transmitter 600 includes multiple multiplexers or other switches 605 for switching between serial and parallel modes, and the receiver 650 includes multiple multiplexers or other switches 655 for switching between the serial and parallel modes. There are approaches to producing or choosing such switches, and these are not illustrated or discussed here. In some embodiments, assuming that there are different electrical requirements that are needed for parallel and serial communication, the switches are controlled carefully to prevent application of improper signals to an interface. In some embodiments, the multiplexer control also manages parallel data that flows opposite to the serial data direction, or parallel data that changes direction (bidirectional) in contrast to unidirectional serial transmission. In some embodiments, the control is performed with as little latency as possible to provide high performance and reduced power consumption.

In a particular example, a pin may operate in serial mode at 100 mV with a 50Ω terminator, and in parallel mode at 1.2V. To switch from serial to parallel mode, the serial transmitter needs to be disabled and the terminator needs to be removed. Otherwise, the pin could be double-driven, causing data errors at minimum and possible damage to the transmitters. With the terminator engaged, the circuit would be required to dissipate over 100 times its expected power (0.2 mW versus 29 mW), potentially causing damage. The serial receiver may have sensitivity to such high voltages and could be damaged as well.

In some embodiments, clock control is utilized for saving power and minimizing latency between serial and parallel modes. In some embodiments, the reference clock may be shared between modes to save pins and system clock power, and a PLL component may be started while still in parallel mode operation to avoid wasting power while preparing for serial operation.

Figure 7:
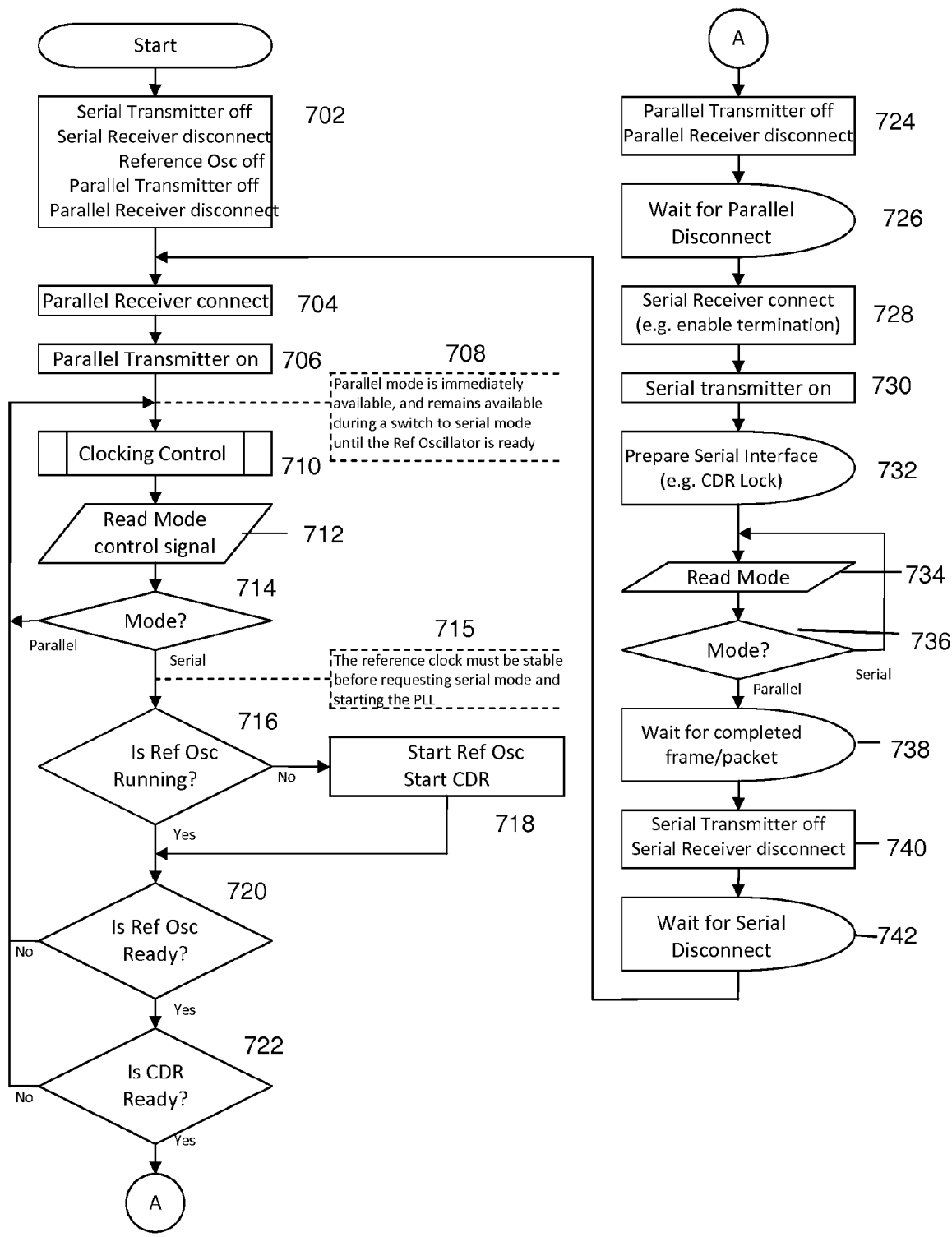
FIG. 7 is a flowchart illustrating an embodiment of a hybrid interface process.
Figure 8:
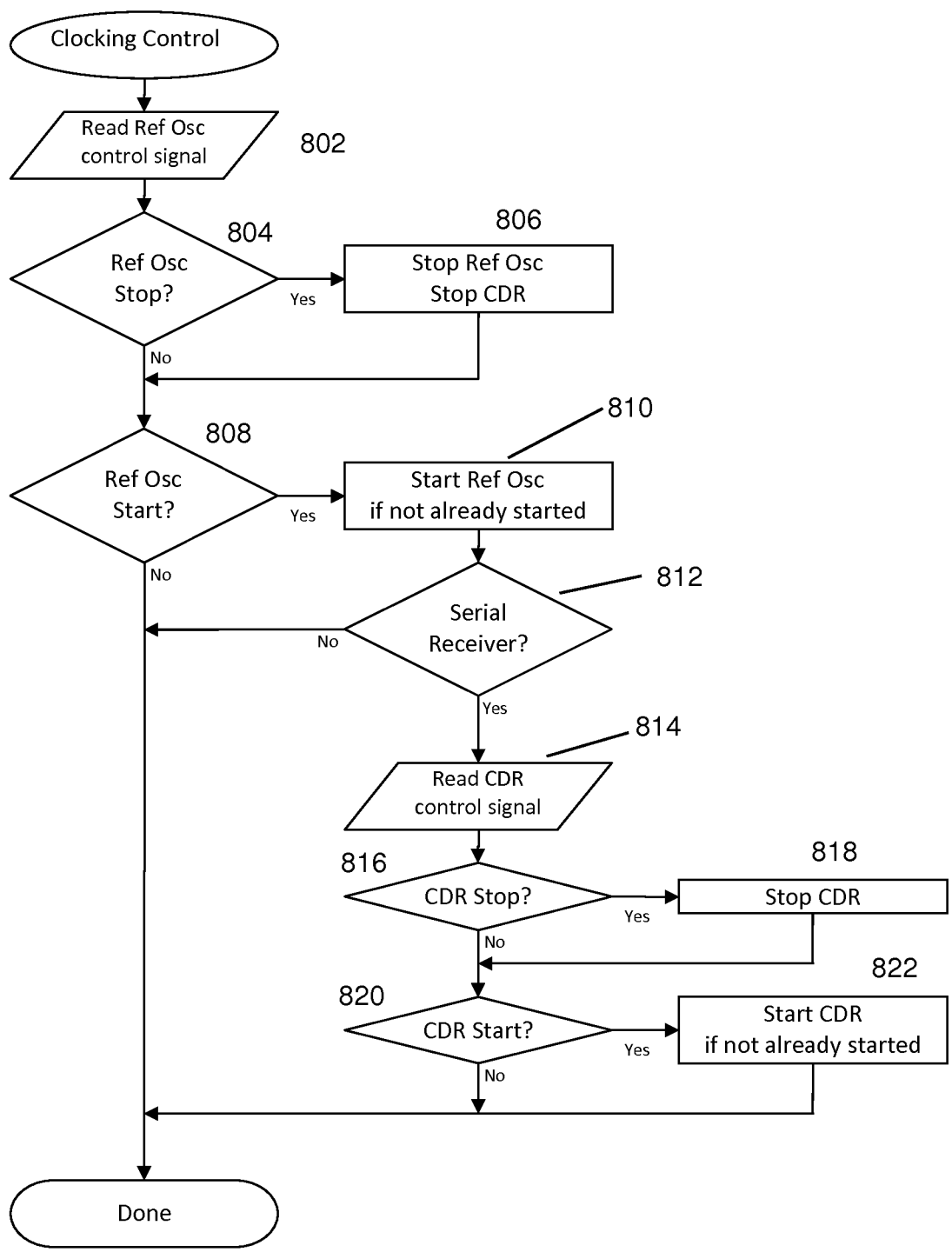
FIG. 8 is a flowchart illustrating an embodiment of a hybrid interface process.

FIG. 7 and FIG. 8 provide flowcharts to illustrate embodiments of a hybrid interface process. In FIG. 7, a hybrid serial-parallel interface may be initialized with a serial transmitter off, a serial receiver disconnected, a reference oscillator (such as a PLL or DLL component) off, a parallel transmitter off, and a parallel receiver disconnected 702. The process may initialize to the parallel interface, but this is not required for embodiments of the process. In some embodiments, the parallel receiver is connected 704 and the parallel transmitter is turned on 706. In some embodiments, the parallel mode may be immediately available and may remain so during a switch to the serial mode until the serial interface is ready (such as until the reference oscillator is ready) 708. The Clocking Control process 710, illustrated in FIG. 8, provides the ability to trade off power and latency while starting and stopping serial communications. The process then provides for monitoring the Mode control signal 712. The mode control signal is tested 714 to determine whether parallel communications continue, or whether serial communication mode is requested. Before the actual transition to serial mode, the reference clock is required to be operating and stable 715. If the mode is parallel 714, the system continues monitoring for a change in mode 710-712. If the Mode signal becomes serial, then there is determination whether the reference oscillator is running 716. If not, the reference oscillator and CDR are started 718 (in an embodiment, the CDR cannot operate without its reference oscillator, and thus the CDR must be stopped if the reference oscillator is stopped). Following the starting of the reference oscillator there is a determination whether the reference oscillator is ready 720 and whether the CDR is ready 722.

When the reference oscillator and CDR are ready, the parallel transmitter is turned off and the parallel receiver is disconnected 724. After a wait for a parallel disconnect 726 the serial receiver is connected (such as enabling a termination for the device) 728 and the serial transmitter is turned on 730. The serial interface is prepared (for example, including locking the CDR) 732. The process then provides for monitoring the Mode control signal 734. If the Mode remains Serial, the process continues with monitoring the Mode. If the Mode becomes Parallel, then there may be a wait for completion of a current frame or packet 738, followed by turning the serial transmitter off and disconnecting the serial receiver 740. After a wait for a serial disconnect 742, the process returns to connection of the parallel receiver 704.

FIG. 8 provides a flowchart to illustrate Clocking Control in some embodiments. In this illustration, a reference oscillator control signal is read 802. If there is a Reference Oscillator Stop condition 804, then the reference oscillator and the CDR are stopped 806. If there is no Reference Oscillator Start condition 808, then the control process is completed. If there is a Reference Oscillator Start condition 808, then the reference oscillator is started (if not already started) 810. If the relevant apparatus does not include a serial receiver 812, then the control process is complete. If the apparatus includes a serial receiver, then a CDR control signal is provided by the process 814, followed by determining if there is a CDR Stop condition 816 (if so, the CDR is stopped 818) and if there is a CDR Start condition 820 (if so, the CDR is stopped if not already stopped 822), and the clocking control process is complete.

In some embodiments, the hybrid interface may be essentially controlled using two signals: Mode control and Reference Oscillator control. Although there are other ways of expressing these controls, this provides a method for describing the process. These controls may be explicitly controlled using an external pin, explicitly controlled using a programmable register that may be controlled using data transfer over the interface, or indirectly by a communication control (link) state machine.

With regard to control options, reference oscillator control may be accomplished independently rather than turning on the reference oscillator when serial communication is requested. The reference oscillator may be automatically stopped when serial communication terminates. However, in some serial interface architectures, some power can still be saved with the serial port disabled and the reference oscillator still running. It may be beneficial to leave the reference oscillator running for short periods when rapidly switching between serial and parallel modes, thus justifying independent reference oscillator control.

In some embodiments, parallel communication may be designated to be the default mode upon initialization. In some embodiments, it is possible to specify 'no mode' or serial mode for initial operation. However, communication is delayed while the reference oscillator starts if serial mode is chosen initially. When unused, parallel mode uses insignificant power and may commence operation immediately, and thus no harm is done by choosing the parallel interface as the default. In addition, the parallel mode may be used immediately and efficiently to set any serial interface parameters, and to control the mode setting (such as, by individual pin, programmable register, or derived state control).

For ease of description of FIGS. 7 and 8 the process of initialization occurs with all interfaces in the disabled or off state to minimize damage and start-up power on both sides of the interface. In other embodiments it is acceptable for the interface to be initialized while in one or the other state. However, in such case consistency on both sides of the interface needs to be ensured to prevent a mismatch between interface modes.

In the description above, for the purposes of explanation, numerous specific details are set forth in order to provide a thorough understanding of the present invention. It will be apparent, however, to one skilled in the art that the present invention may be practiced without some of these specific details. In other instances, well known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The computer-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. A method comprising:
   initializing a first apparatus for transmission of data to or reception of data from a second apparatus, the first apparatus including a reference oscillator circuit;
   enabling an interface for the first apparatus initially in a first mode for a parallel interface with the second apparatus, the parallel interface including a first plurality of pins, wherein the parallel interface has a first voltage swing;
   transmitting parallel data to the second apparatus or receiving parallel data from the second apparatus in the first mode via the first plurality of pins;
   enabling the reference oscillator circuit and enabling the interface of the first apparatus in a second mode for a serial interface with the second apparatus, the serial interface including a second plurality of pins, the first plurality of pins and the second plurality of pins both including an overlapping set of pins, wherein the serial interface has a second voltage swing, the second voltage swing being smaller than the first voltage swing; and
   transmitting serial data to the second apparatus or receiving serial data from the second apparatus in the second mode via the second plurality of pins.

2. The method of claim 1, wherein the parallel interface is not resistively terminated by whichever of the first apparatus or the second apparatus is receiving parallel data.

3. The method of claim 1, wherein the serial interface is resistively terminated by whichever of the first apparatus or the second apparatus is receiving serial data.

4. The method of claim 1, wherein the voltage swing for the serial interface is less than one-half of an interface supply voltage.

5. The method of claim 1, wherein the voltage swing for the serial interface may be set independently of supply voltages for the first and second apparatuses and of termination of the first and second apparatuses.

6. The method of claim 1, wherein the serial interface uses single-ended signaling.

7. The method of claim 1, wherein the parallel interface uses single-ended signaling.

8. An apparatus comprising:
   an interface for transmission of data to or reception of data from a second apparatus, wherein the interface includes:
   a first mode for a parallel interface with the second apparatus, the parallel interface including a first plurality of pins for transmitting parallel data to the second apparatus or receiving parallel data from the second apparatus in the first mode, wherein the parallel interface has a first voltage swing, and
   a second mode for a serial interface with the second apparatus, the serial interface including a second plurality of pins for transmitting serial data to the second apparatus or receiving serial data from the second apparatus in the second mode, the first plurality of pins and the second plurality of pins both including an overlapping set of pins, wherein the serial interface has a second voltage swing, the second voltage swing being smaller than the first voltage swing; and
   a reference oscillator circuit, wherein for the second mode the reference oscillator circuit is enabled if the reference oscillator circuit is disabled.

9. The apparatus of claim 8, wherein the parallel interface is not resistively terminated by whichever of the apparatus and the second apparatus is receiving parallel data.

10. The apparatus of claim 8, wherein the serial interface is resistively terminated by whichever of the apparatus and the second apparatus is receiving serial data.

11. The apparatus of claim 8, wherein the voltage swing for the serial interface is less than one-half of an interface supply voltage.

12. The apparatus of claim 8, wherein the voltage swing for the serial interface may be set independently of supply voltages for the first and second apparatuses and of termination of the first and second apparatuses.

13. The apparatus of claim 8, wherein the serial interface uses single-ended signaling.

14. The apparatus of claim 8, wherein the parallel interface uses single-ended signaling.

15. A computer-readable medium having stored thereon data representing sequences of instructions that, when executed by a processor, cause the processor to perform operations comprising:
  initializing a first apparatus for transmission of data to or reception of data from a second apparatus, the first apparatus including a reference oscillator circuit;
  enabling an interface for the first apparatus initially in a first mode for a parallel interface with the second apparatus, the parallel interface including a first plurality of pins, wherein the parallel interface has a first voltage swing;
  transmitting parallel data to the second apparatus or receiving parallel data from the second apparatus in the first mode via the first plurality of pins;
  enabling the reference oscillator circuit and enabling the interface of the first apparatus in a second mode for a serial interface with the second apparatus, the serial interface including a second plurality of pins, the first plurality of pins and the second plurality of pins both including an overlapping set of pins, wherein the serial interface has a second voltage swing, the second voltage swing being smaller than the first voltage swing; and
  transmitting serial data to the second apparatus or receiving serial data from the second apparatus in the second mode via the second plurality of pins.

16. The medium of claim 15, wherein the parallel interface is not resistively terminated by whichever of the first apparatus or the second apparatus is receiving parallel data.

17. The medium of claim 15, wherein the serial interface is resistively terminated by whichever of the first apparatus or the second apparatus is receiving serial data.

18. The medium of claim 15, wherein the voltage swing for the serial interface is less than one-half of an interface supply voltage.

19. The medium of claim 15, wherein the voltage swing for the serial interface may be set independently of supply voltages for the first and second apparatuses and of termination of the first and second apparatuses.

20. The medium of claim 15, wherein the serial interface uses single-ended signaling.

21. The medium of claim 15, wherein the parallel interface uses single-ended signaling.

* * * * *